(12) United States Patent
Huynh et al.

(10) Patent No.: US 10,377,467 B2
(45) Date of Patent: *Aug. 13, 2019

(54) ROTATING CIRCULAR AEROFOIL AND PROPELLER SYSTEM

(71) Applicants: Thoi H. Huynh, Seattle, WA (US); Fuji P. Hynh, Seattle, WA (US)

(72) Inventors: Thoi H. Huynh, Seattle, WA (US); Fuji P. Hynh, Seattle, WA (US)

( * ) Notice: Subject to any disclaimer, the term of this patent is extended or adjusted under 35 U.S.C. 154(b) by 378 days.

This patent is subject to a terminal disclaimer.

(21) Appl. No.: 15/200,915

(22) Filed: Jul. 1, 2016

(65) Prior Publication Data

US 2018/0001993 A1 Jan. 4, 2018

Related U.S. Application Data

(63) Continuation-in-part of application No. 13/694,082, filed on Oct. 26, 2012, now Pat. No. 9,381,988.

(51) Int. Cl.
*B64C 27/20* (2006.01)
*B64C 11/00* (2006.01)

(52) U.S. Cl.
CPC ................. *B64C 11/007* (2013.01)

(58) Field of Classification Search
CPC ......... B63H 1/14; B64C 11/007; F01D 5/225; A63H 33/185
USPC ......................................... 416/189
See application file for complete search history.

(56) References Cited

U.S. PATENT DOCUMENTS

| 1,542,853 | A | | 6/1925 | Callahan | |
|---|---|---|---|---|---|
| 2,378,125 | A | | 6/1945 | Lee | |
| 2,426,742 | A | | 9/1947 | Pawlowski | |
| 2,855,179 | A | | 10/1958 | Brown | |
| 3,124,200 | A | * | 3/1964 | Wilson | B63H 1/16 415/208.1 |
| 4,301,981 | A | * | 11/1981 | Hartt | B64C 27/32 244/12.2 |
| 5,503,351 | A | * | 4/1996 | Vass | B64C 39/064 244/12.2 |
| 2011/0097209 | A1 | | 4/2011 | Solozano | |

* cited by examiner

*Primary Examiner* — Justin D Seabe
*Assistant Examiner* — Jason A Fountain
(74) *Attorney, Agent, or Firm* — Dean A. Craine, PS

(57) ABSTRACT

A rotating circular aerofoil system that includes a disc body that has an aerofoil shape in cross section. The aerofoil shape has an angle of attack that is symmetrical. The disc body's includes a circular inner edge which forms a circular center opening and the disc body's leading edge. The disc body also includes an outer edge that forms the trailing edge. Intersecting ribs extend across the center opening and include a shaft opening that attaches to a rotating shaft. Formed on the top and bottom surfaces of the disc body are evenly spaced apart, extending T-shaped or L-shaped fins. In one embodiment, an air blower or impeller is attached to a hollow shaft linked to an air pump. When the air pump is activated, air is delivered to the air blower and impeller that distributes the air over the top surface of the disc body to improve lift.

10 Claims, 4 Drawing Sheets

US 10,377,467 B2

ROTATING CIRCULAR AEROFOIL AND PROPELLER SYSTEM

This is a continuation in part application based on U.S. utility patent application (application Ser. No. 13/694,082), filed on Oct. 10, 2012, now U.S. Pat. No. 9,381,988.

COPYRIGHT NOTICE

Notice is given that the following patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention

This invention relates to conventional aerofoil and hydrofoil which produce a force perpendicular to the motion called lift. The well-known aerofoil principal has been applied in producing fixed wings and propellers for aircrafts. This same principal also has been applied to create lift for high speed watercraft known as hydrofoils

2. Description of the Related Art

Due to the upper curved shape of the aerofoil, fluid travels faster for a longer path across the top surface than the bottom surface of the aerofoil producing lower pressure over the top surface, therefore creating lift.

Conventional aerofoils and hydrofoils usually must travel through a fluid to create lift. The present invention is for an aerofoil and hydrofoil that does not need to pass through fluids but create lift by rotating about its axis.

SUMMARY OF THE INVENTION

The present invention is for a rotating circular aerofoil and propeller system with its main body sectional-shape similar to modern airplane wings, having a leading edge and a trailing edge, but is symmetrical about its axis. This circular aerofoil and propeller system includes a circular hollow at its center where the leading edge begins and a circular outer edge where its trailing edge ends. Pairs of T-shaped or L-shaped fins or a mixture T-shaped and L-shaped fins are attached to the top surface and bottom surface of the main body, which run radiately from the inner edge to the outer edge, to create centrifugal action of fluid when the circular aerofoil rotates about its center axis. As a result, the fluid in contact to the disc body travels from the leading edge to the trailing edge on both the top and bottom surfaces. A force perpendicular to this motion, called lift, is created when the circular aerofoil rotates around its center axis.

In different embodiments, the aerofoil includes additional means for pushing air over the top and bottom surfaces of the disc body to improve lift.

DESCRIPTION OF THE DRAWINGS

FIG. 1C shows an enlarged cross-sectional view of the L-shaped fin.

DESCRIPTION OF THE PREFERRED EMBODIMENT(S)

Figure 1:
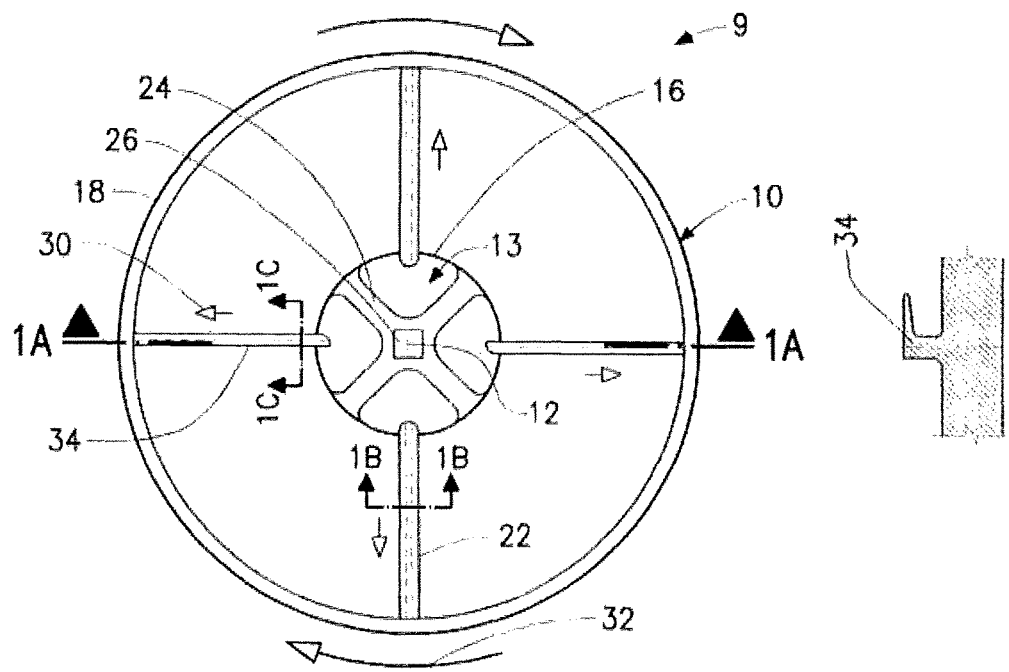
FIG. 1 shows a top view of a rotating circular aerofoil and propeller system made in accordance with one embodiment of the present invention.

Reference Numeral in Drawings 9 aerofoil system;
10 disc body
12 axis disc body;
13 center opening;
14 body-sectional-shape of the disc body;
15 top surface of the disc body;
16 circular inner edge/leading edge of the disc body;
17 bottom surface of the disc body;
18 circular outer edge/trailing edge of the disc body;
20 angle of attack of the aerofoil;
22 pair of fins;
24 spokes;
25 intersection section of the spokes;
26 center hole;
28 lift force of the aerofoil;
30 air travel direction when the disc body rotates;
32 rotating direction of the disc body;
34 L-shaped fin;
36 air blower;
37 cylindrical body;
38 air blower port (to push more air/fluid thru the aerofoil body and improve lift);
40 turn shaft;
42 center hub;
44 centrifugal impeller (to push more air/fluid thru aerofoil body and improve lift);
46 impeller blade; and,
100 air pump

DETAILED DESCRIPTION OF THE INVENTION

Figure 1A:
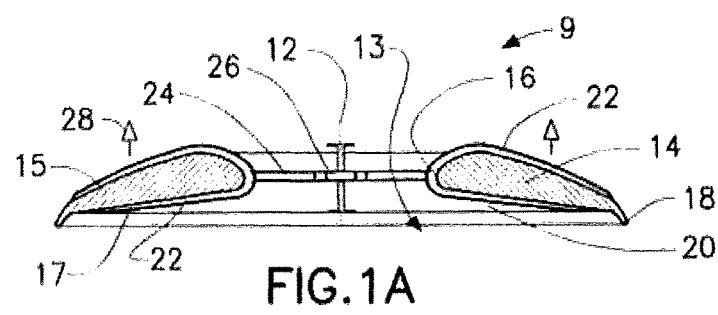
FIG. 1A shows a cross sectional view of the rotating circular aerofoil and propeller, taking along line 1A-1A in FIG. 1.
Figure 4:
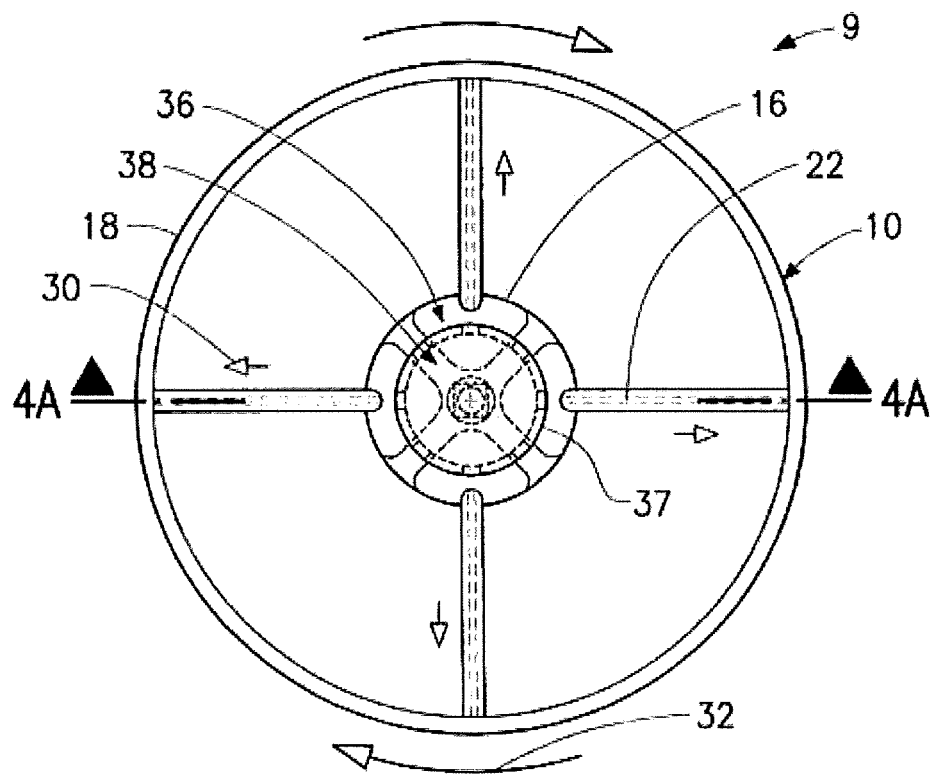
FIG. 4 shows a top plan view of the rotating circular aerofoil system with an air blower.
Figure 5:
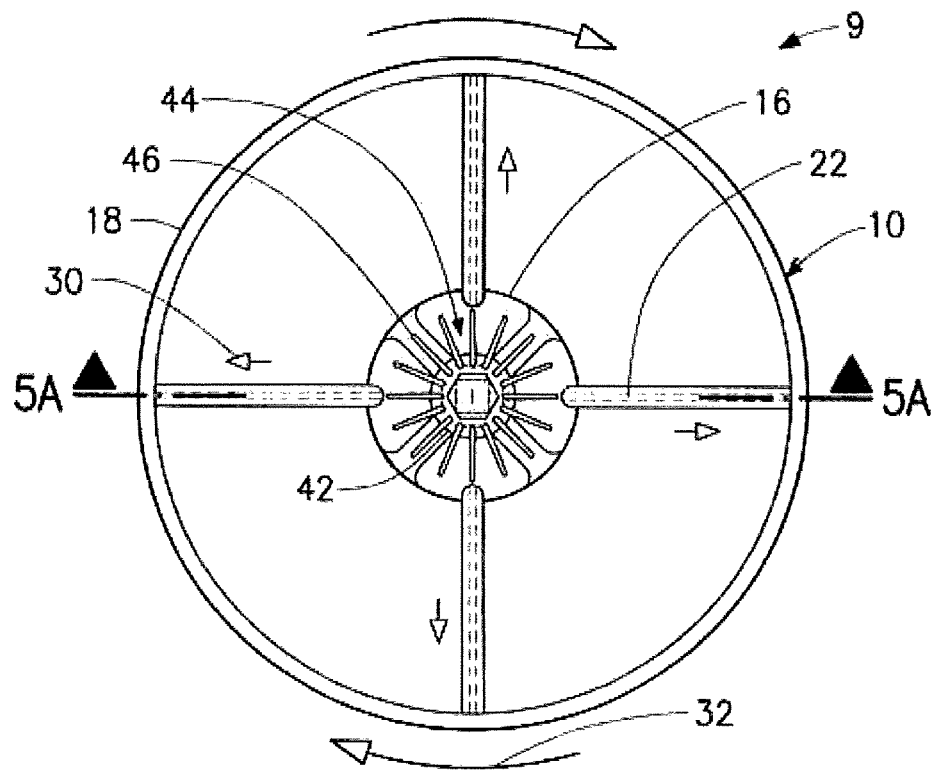
FIG. 5 shows a top plan view of the rotating circular aerofoil system with the centrifugal impeller.

Referring to FIG. 1, illustrated is a top view of a rotating circular aerofoil system 9 made in accordance with a preferred embodiment of the present invention. The system 9 includes a circular disc body 10 made to be symmetrical about its center axis 12. The disc body 10 has a uniform and symmetrical aerofoil shape cross-section 14 as shown in FIG. 1A, and is made of lightweight composite or other suitable materials. A circular center opening 13 coaxially aligned with the central axis 12 is formed in the disc body 10. The perimeter edge of the center opening 13 acts also as the disc body's leading edge 16. Formed or mounted on the disc body 10 is a pair of fins 22 or 34 made of similar material as the disc body 10. Four spokes 24 extend across the center opening 13 and intersect at an intersection section 25 at the center axis 12. The spokes 24 are made of strong material that can be attached to the disc body 10. Formed centrally in the intersection section 25 of the spokes 24 is a center hole 26 configured to engage a rotating shaft 40, as shown in FIGS. 4 and 5.

Referring to FIG. 1A is a cross-sectional view of the rotating circular aerofoil system 9 through line 1A-1A in FIG. 1 showing the disc body's aerofoil shape cross-sectional shape, the fins 22 formed on the top and bottom surfaces of the disc body 10, and the spokes 26.

Figure 1B:
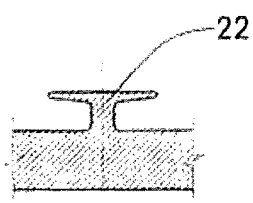
FIG. 1B shows an enlarged cross sectional view of the tee-shape fin of the rotating circular aerofoil and propeller system, taking along line 1B-1B in FIG. 1.

Referring to FIG. 1B, is an enlarged cross-sectional view taken along line 1B-!B in FIG. 1 showing a fin 22 mounted or formed on the top surface of the disc body 10 that has a T-shape configuration.

Figure 2:
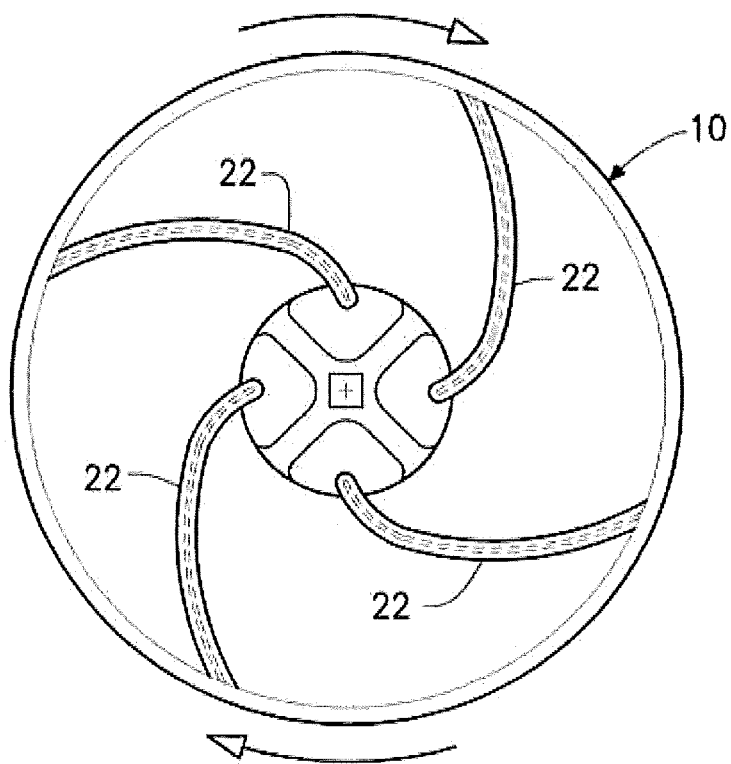
FIG. 2 shows a top view of a rotating circular aerofoil and propeller system made in accordance with one embodiment of the present invention with all of the T-shaped fins uniformly curved counterclockwise.

Referring to FIG. 2, illustrated is the top view of another embodiment of the rotating circular aerofoil system 9 made in accordance with a preferred embodiment of the present invention as described as in FIG. 1 above; showing all the fins 22 uniformly curved counterclockwise to improve the aerodynamic of the rotating disc body 10. This alternative embodiment is used when the disc body 10 is made to rotate clockwise only.

Figure 3:
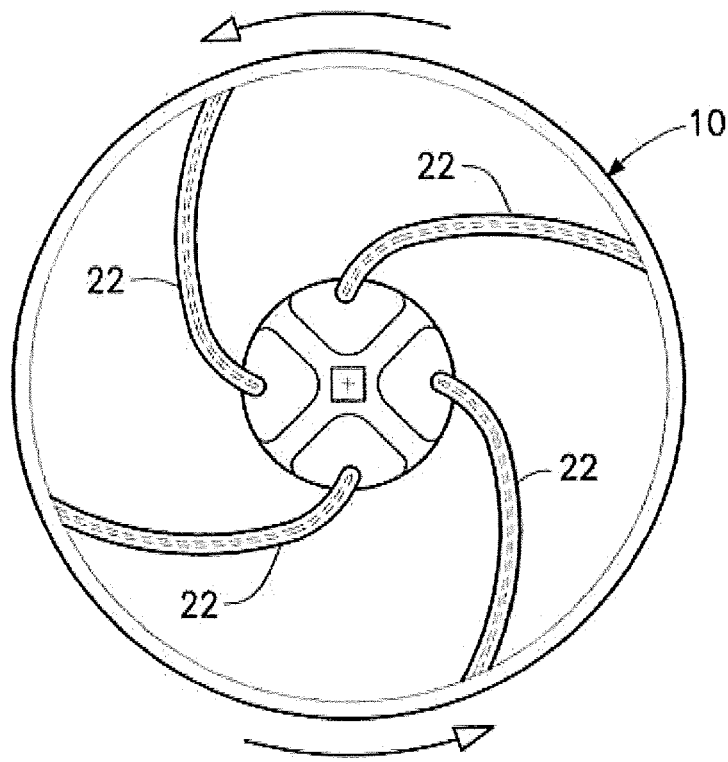
FIG. 3 shows a top view of a rotating circular aerofoil and propeller system made in accordance with one embodiment of the present invention with all of the T-shaped fins uniformly curved clockwise.

Referring to FIG. 3, illustrated is the top view of a rotating circular aerofoil system 9 as described as in FIG. 1 above; only with all the fins 22 uniformly curved clockwise to improve the aerodynamic of the rotating disc body 10. The fins 22 are curved clockwise when the disc body 10 is made to rotate counterclockwise only.

Operation

When a conventional aerofoil-shape body moves through the air, fluid travels from the leading edge to the trailing edge, producing a force perpendicular to the motion called lift. Used in water to create lift, the disc body 10 is known as a hydrofoil. In this present invention, the inner perimeter edge 16 of the rotating disc body 10 serves as the leading edge while its outer edge 18 serves as the trailing edge as used in the conventional aerofoil. When the circular disc body 10 rotates about its center axis 12, causing the fluid in contact to travel from the inner edge 16 to the outer edge 18 due to the centrifugal action created by the fins 22, and produces the same known lift force.

More than two pairs of fins 22 are produced to maximize fluid flow to improve lift.

Figure 4A:
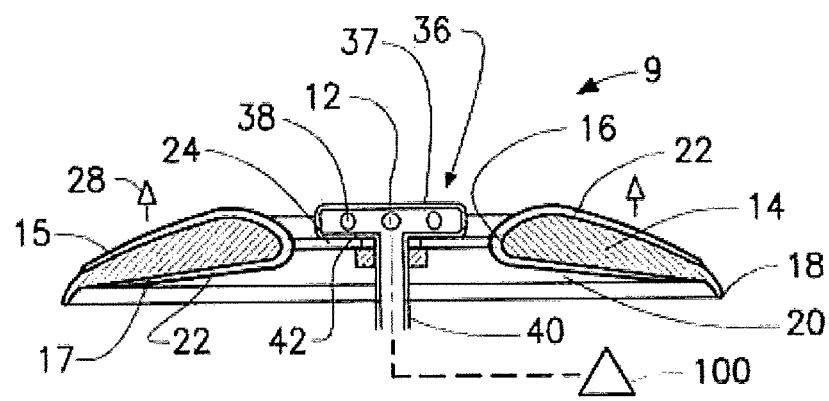
FIG. 4A shows a cross-sectional view of the rotating aerofoil system with the air blower.

FIGS. 4 and 4A show a top plan view and cross-sectional view, respectively, of another embodiment of the rotating circular aerofoil system 9 that includes a means for pushing air over the top surface of the disc body 10 to improve lift. In the embodiment shown in FIGS. 4 and 4A, the means for pushing air includes an air blower 36 located centrally and coaxially aligned with the disc body's center axis 12. The air blower 36 includes a hollow cylindrical body 37 with a plurality of evenly spaced apart ports 38 formed on its side walls. The cylindrical body 37 is mounted on the upper end of a vertical hollow shaft 40 configured to transmit air from an air pump 100. The air pump 100 may be linked to an engine (not shown) that rotates the disc body 10 or a separate structure.

The cylindrical body 37 may be affixed to the disc body 10 or configured to rotate independently from the disc body 10. When the cylindrical body 37 is rotated and air from the air pump 100 is pushed outward from the ports 38 to flow laterally over the top surface of the disc body 10 to improve lift.

Figure 5A:
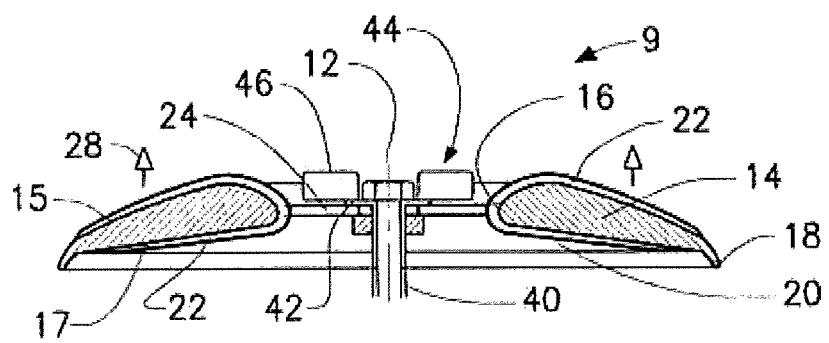
FIG. 5A shows a cross-sectional view of the rotating aerofoil system 9 with the centrifugal impeller.

FIGS. 5 and 5A show an alternative means for pushing air over the top surface of the disc body 10 that includes an impeller 44 mounted on the top end of a vertical shaft 40. The shaft 40 may be a solid structure or a hollow structure configured to deliver air from an optional air pump 100. The impeller 44 includes a center hub 42 and a plurality of blades 46 that extend radially outward from the center hub 42. The blades 46 are configured to force air laterally from the hub's center axis. The impeller 44 may rotate independently over the shaft 40 or fixed to the shaft 40 and rotates with the shaft 40 is rotated. During operation, the impeller 44 rotates and the blades 46 force air that flows against the hub 42 laterally and over the top surface of the disc body 10 to improve lift. If additional lift is needed, a shaft 40 may be a hollow shaft hollow shaft, similar to the hollow shaft 40 shown in FIGS. 4 and 4A, that connects to an air pump 100 to forcible deliver air from the air pump 100 to the center hub 42 and over the top surface of the disc body 10.

In compliance with the statute, the invention described has been described in language more or less specific as to structural features. It should be understood, however, that the invention is not limited to the specific features shown, since the means and construction shown comprises the preferred embodiments for putting the invention into effect. The invention is therefore claimed in its forms or modifications within the legitimate and valid scope of the amended claims, appropriately interpreted in accordance with under the doctrine of equivalents.

We claim:

1. A rotating circular aerofoil and propeller system, comprising:
   a disc body with a circular outer edge and a coaxially aligned center opening, a section of said disc body extending from said outer edge to said center opening having an aerofoil shape when viewed in cross-section with an angle of attack tilted upward, said outer edge curved downward from said disc body;
   a set of intersecting spokes located inside said central opening;
   a center shaft opening formed on the intersecting area of said spokes; and,
   a plurality of fixed fins extending outward from said top surface and said bottom surface of said disc body, respectively, each said fin being L-shaped in cross section and extending radially over said disc body.

2. The rotating circular aerofoil and propeller system of claim 1, wherein said fins are uniformly curved to the left to improve the aerodynamic of the circular aerofoil when said top surface faces upward and is rotated in a clockwise direction to produce lift.

3. The rotating circular aerofoil and propeller system of claim 1, wherein said fins are uniformly curved to the right to improve the aerodynamic of the circular aerofoil when said top surface faces upward and is rotated in a counterclockwise direction to produce lift.

4. A rotating circular aerofoil and propeller system, comprising:

a disc body with a circular outer edge and a coaxially aligned center opening, a section of said disc body extending from said outer edge to said center opening having an aerofoil shape when viewed in cross-section with an angle of attack tilted upward, said outer edge curved downward from said disc body;

a set of intersecting spokes located inside said central opening;

a center shaft opening formed on the intersecting area of said spokes; and, fixed fins extending outward from said top surface and said bottom surface of said disc body; and, means for pushing air over said disc body.

5. The rotating circular aerofoil and propeller system as recited in claim 4, wherein said means for pushing air over said disc body is an air blower that includes a disc body connected to a hollow shaft linked to an air pump, said disc body includes a plurality air conduits that deliver air from the air pump laterally and over the top surface of said disc body.

6. The rotating circular aerofoil and propeller system of claim 5, wherein said fixed fins are all T-shaped or all L-shaped in cross-section or a combination of T-shaped or L-shaped fins.

7. The rotating circular aerofoil and propeller system as recited in claim 4, wherein said means for pushing air over said disc body is a rotating impeller located over said center opening and mounted to a shaft, said impeller includes a hub and a plurality of laterally extending blades each configured to deliver air over the top surface of said disc body when said hub is rotated.

8. The rotating circular aerofoil and propeller system of claim 7, wherein said fixed fins are all T-shaped or all L-shaped in cross-section or a combination of T-shaped or L-shaped fins.

9. The rotating circular aerofoil and propeller system of claim 8, wherein said fins are uniformly curved to the left to improve the aerodynamic of the circular aerofoil when said top surface faces upward and is rotated in a clockwise direction to produce lift.

10. The rotating circular aerofoil and propeller system of claim 8, wherein said fins are uniformly curved to the right to improve the aerodynamic of the circular aerofoil when said top surface faces upward and is rotated in a clockwise direction to produce lift.

\* \* \* \* \*